(12) United States Patent  (10) Patent No.: US 7,447,244 B2
Ma et al.  (45) Date of Patent: Nov. 4, 2008

(54) WAVELENGTH CONVERSION LASER DEVICE

(75) Inventors: Byung Jin Ma, Suwon (KR); Kiyoyuki Kawai, Suwon (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 11/808,824

(22) Filed: Jun. 13, 2007

(65) Prior Publication Data

US 2008/0037600 A1  Feb. 14, 2008

(30) Foreign Application Priority Data

Aug. 9, 2006 (KR) .................. 10-2006-0075405

(51) Int. Cl.
  *H01S 3/10* (2006.01)
  *H01S 3/08* (2006.01)
(52) U.S. Cl. .................... 372/21; 372/22; 372/108
(58) Field of Classification Search .......... 372/14, 372/21, 22, 29.01, 38.01, 92, 98, 99, 108
  See application file for complete search history.

(56) References Cited

U.S. PATENT DOCUMENTS 6,614,584 B1  9/2003  Govorkov et al.

2004/0240491 A1  12/2004  Nebel et al.
2006/0072635 A1  4/2006  Wang

FOREIGN PATENT DOCUMENTS

JP  2005/10739  1/2005
JP  2005-122094  5/2005

*Primary Examiner*—Armando Rodriguez
(74) *Attorney, Agent, or Firm*—McDermott Will & Emery LLP

(57) ABSTRACT

A wavelength conversion laser device includes a laser light source for emitting a first wavelength light, a nonlinear optical crystal for converting the first wavelength light into a second wavelength light, and a nonlinear optical crystal rotator for rotating the nonlinear optical crystal so as to change an incident angle of the first wavelength light into the nonlinear optical crystal. The device also includes a nonlinear optical crystal rotation driving controller for controlling a rotation amount of the rotator in accordance with an output change of the second wavelength light so that the nonlinear optical crystal has phase matching with the first wavelength light. The device further includes a light exit position adjustor for compensating an exit position change of the second wavelength light in accordance with the incident angle change of the first wavelength light so that the second wavelength light is outputted in a predetermined exit position.

19 Claims, 5 Drawing Sheets

WAVELENGTH CONVERSION LASER DEVICE

CLAIM OF PRIORITY

This application claims the benefit of Korean Patent Application No. 2006-0075405 filed on Aug. 9, 2006, in the Korean Intellectual Property Office, the disclosure of which is incorporated herein by reference.

BACKGROUND OF THE INVENTION

1. Field of the Invention

The present invention relates to a wavelength conversion laser device and, more particularly, to a wavelength conversion laser device which has a nonlinear crystal for generating a second harmonic wave and a structure for rotating the nonlinear crystal for phase matching with a fundamental wave.

2. Description of the Related Art

Recently, there has been an increasing demand for semiconductor lasers in the fields of various displays and light record devices. In particular, as the application range of the semiconductor laser has been expanded to realize full colors in the display field, there has been an increasing demand for lasers having low power-consumption characteristics and capable of high output in a visible ray region.

To obtain red light, AlGaInP or AlGaAs-based semiconductor lasers are relatively easily produced and used. However, in order to obtain green or blue light, it is difficult to grow a semiconductor material due to the unique lattice constant or thermal expansion coefficient of the group III nitride semiconductor. Also, there are problems related to crystal defects such as dislocation, which degrades the reliability and shortens the lifetime of the lasers.

To remedy such problems, a method of converting a wavelength using non-linear characteristics has been used. Diode-pumped Solid-State (DPSS) lasers have gained attention as a method of using the non-linear characteristics. For example, light of a pump laser diode in a band of 808 nm is made to be incident into a crystal like Nd:YAG to obtain a wavelength in the vicinity of 1060 nm, and the frequency is increased by two folds using a nonlinear optical crystal to obtain green light in the vicinity of 530 nm.

In the DPSS laser device, the nonlinear optical crystal such as a crystal for second harmonic generation exhibits refractive index changes due to temperature according to the crystal direction, and thus the incident angle for phase matching, i.e., for optimal wavelength conversion efficiency varies according to the temperature. Therefore, there is required a method for maintaining regulated wavelength conversion efficiency of the non-linear optical crystal within the temperature range of the laser device.

Conventionally, there has been a method of adopting Thermo-electric Cooler (TEC) using a Peltier device and a heat radiating structure, which however increases power consumption or the size of the system. In order to overcome such drawbacks, U.S. Pat. No. 6,614,584 to Govorkov et al. suggests monitoring the light output and displacing the non-linear optical crystal in response to the monitoring result to obtain an incident angle of optimal phase matching condition.

FIG. 1 is a schematic view illustrating a wavelength conversion laser device suggested in the above document.

The wavelength conversion laser device 10 shown in FIG. 1 includes a laser light source 1 and a non-linear optical crystal 5 for converting a wavelength light of the laser light source 1 into a desired wavelength light.

In the wavelength conversion laser device 10, a part of the wavelength light outputted from the nonlinear crystal 5 proceeds to a second beam splitter 2b through a first beam splitter 2a. The second beam splitter 2b separates the light into a vertical component and a horizontal component, and the separated wavelength components are transmitted to first and second location detectors 7a and 7b through a spectral filter 4, respectively. The first and second location detectors 7a and 7b detect the degree of phase mismatching of the light received. According to the detection result, a controller 8 generates displacement $\gamma$ in the non-linear optical crystal through a rotator 6 so as to obtain an incident angle for optimal output condition.

As described above, the wavelength conversion laser device 10 shown in FIG. 1 monitors the output of light converted by the non-linear optical crystal 6 to provide the degree of phase mismatching due to the current condition (e.g. temperature) as feedback, and according to the result, generates displacement in the non-linear optical crystal 5, thereby maintaining maximum light conversion efficiency.

However, the wavelength conversion laser device 10 has a problem in that the final output position is altered according to the displacement $\gamma$ of the non-linear optical crystal 5. More specifically, as shown in FIG. 1, when the non-linear optical crystal 5 is displaced (indicated with dotted line), the exit position of light changes from OUT1 to OUT2, causing displacement $\Delta\alpha$ in the exit position.

Due to such displacement in the exit position, the device has lower precision, and it is difficult to arrange an optical system at the output side. This can cause a serious problem in an ultra-miniaturized product such as a portable projector, which is in the spotlight recently as an application of the laser device.

SUMMARY OF THE INVENTION

The present invention has been made to solve the foregoing problems of the prior art and therefore an aspect of the present invention is to provide a wavelength conversion laser device which compensates displacement of output light caused by displacement of a non-linear optical crystal generated for phase matching condition, thereby maintaining a regulated light exit position.

According to an aspect of the invention, the invention provides a wavelength conversion laser device, which includes a laser light source for emitting a first wavelength light; a nonlinear optical crystal for converting the first wavelength light into a second wavelength light; a nonlinear optical crystal rotator for rotating the nonlinear optical crystal so as to change an incident angle of the first wavelength light into the nonlinear optical crystal; a nonlinear optical crystal rotation driving controller for controlling a rotation amount of the rotator in accordance with an output change of the second wavelength light in order for the nonlinear optical crystal to have phase matching with the first wavelength light; and a light exit position adjustor for compensating an exit position change of the second wavelength light in accordance with the incident angle change of the first wavelength light so that the second wavelength light is outputted in a predetermined exit position.

According to an embodiment of the present invention, the nonlinear optical crystal rotation driving controller includes a first electronic controller for driving the nonlinear optical crystal rotator in accordance with the output change of the second wavelength light from the nonlinear optical crystal in order for the nonlinear optical crystal to have phase matching with the first wavelength light; and a first beam splitter for sampling a portion of light outputted from the nonlinear optical crystal to provide the sampled portion to the first electronic controller.

In this case, the first electronic controller includes a first output monitor for detecting the output change of the second wavelength light; and a first driving controller for generating a rotation control signal corresponding to an incident angle change amount of the nonlinear optical crystal based on the detected output change of the second wavelength light and transmitting the signal to the nonlinear optical crystal rotator for phase matching with the first wavelength light.

The nonlinear optical crystal rotation driving controller further includes a spectral filter disposed between the first electronic controller and the first beam splitter, the spectral filter for selectively separating the second wavelength light from light provided from the first beam splitter and providing the second wavelength light to the first electronic controller.

According to an exemplary embodiment of the present invention, the light exit position adjustor includes a transparent optical member for refracting the second wavelength light according to an incident angle of the second wavelength light outputted from the nonlinear optical crystal so as to change the exit position of the second wavelength light; an optical member rotator for rotating the transparent optical member so as to change the incident angle of the second wavelength light into the transparent optical member; and an optical member rotation driving controller for controlling a rotation amount of the optical member rotator so as to compensate the exit position change of the second wavelength light due to rotation of the nonlinear optical crystal.

In this case, the transparent optical member is composed of a first surface used as an incident surface and a second surface in parallel with the first surface and used as an exit surface. The transparent optical member may be made of an optical isotropic material, and also can be made of the same material as the nonlinear optical crystal.

In this embodiment, it is preferable that the first beam splitter is disposed between the nonlinear optical crystal and the transparent optical member.

The optical member rotation driving controller includes a second electronic controller for driving the optical member rotator in accordance with the output change of the second wavelength light from the nonlinear optical crystal so that the second wavelength light exits from the transparent optical member in a predetermined exit position; and a second beam splitter for detecting a portion of light outputted from the nonlinear optical crystal to provide the potion of light to the second electronic controller.

In this case, the second electronic controller includes a second output monitor for detecting the exit position change of the second wavelength light due to rotation of the nonlinear optical crystal; and a second driving controller for generating a control signal corresponding to an incident angle change amount of the optical member and transmitting the signal to the optical member rotator so as to compensate the detected exit position change of the second wavelength light. Preferably, the second beam splitter is disposed at an output side of the transparent member, thereby more precisely compensating the light exit position based on the positional change at the final output side.

In addition, the optical member rotation driving controller further includes a spatial filter having a slit formed along an output direction of the second wavelength light, the spatial filter configured to change an output amount of the second wavelength light passing through the slit according to the exit position change of the second wavelength light. In this case, it is preferable that the spatial filter is disposed between the transparent optical member and the second beam splitter.

According to another embodiment of the present invention, the first and second electronic controllers can be integrated to allow two feedback controls through a time division multiplexing, etc. using one output monitor and one driving controller.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
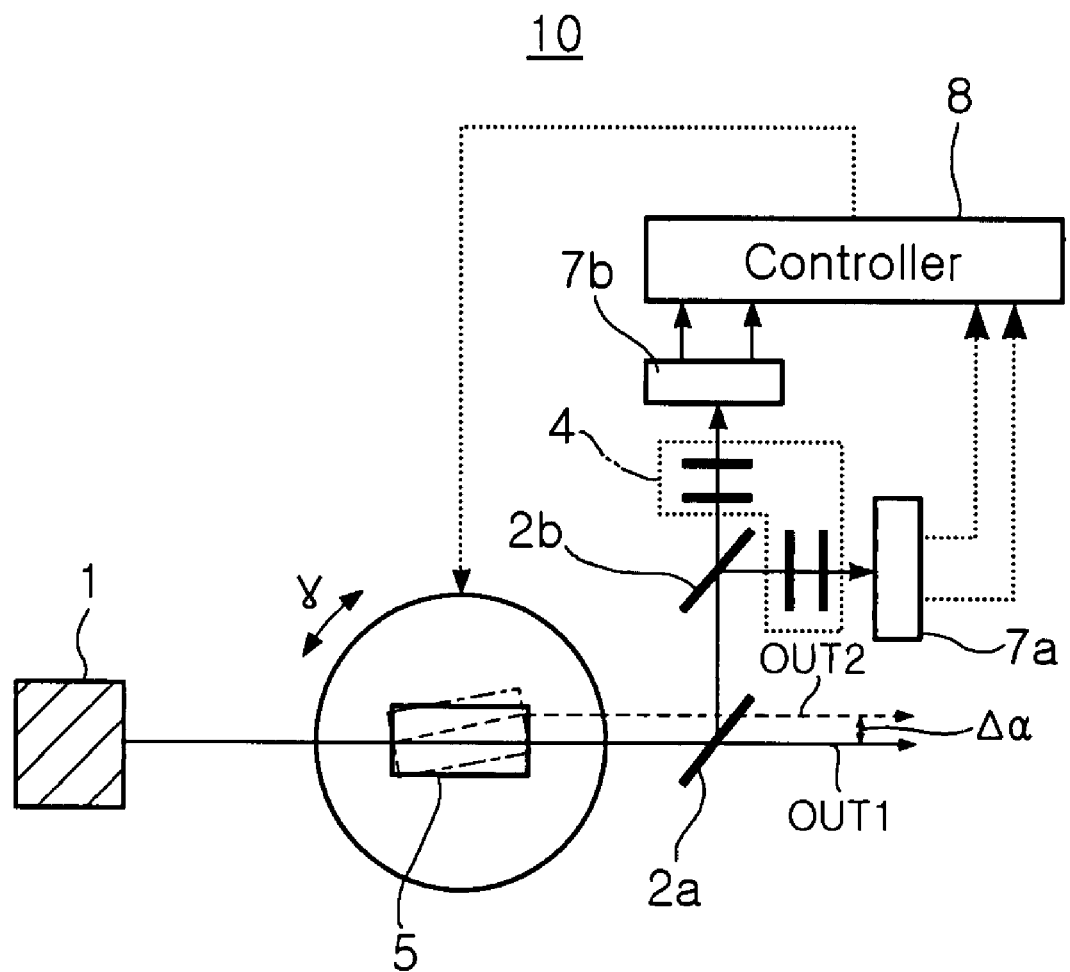
FIG. 1 is a schematic view illustrating a conventional wavelength conversion laser device.
Figure 2:
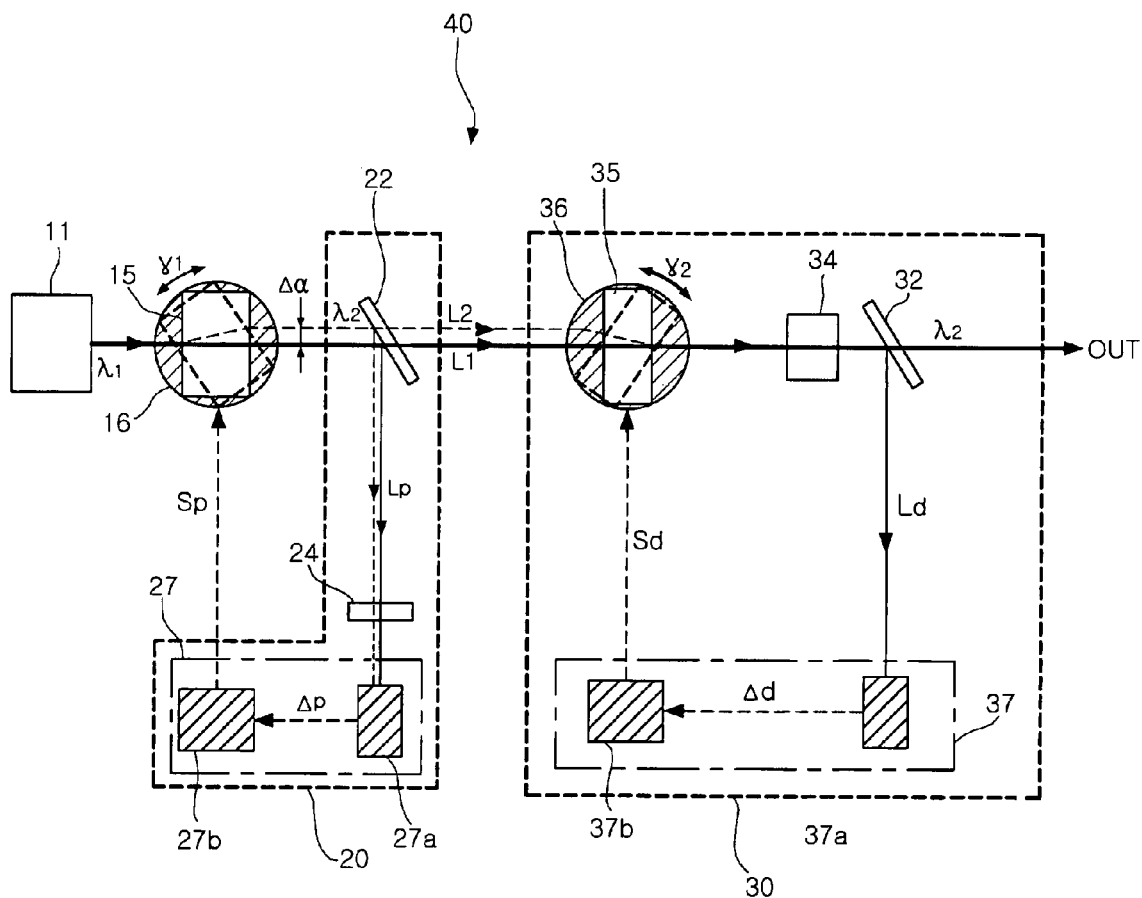
FIG. 2 is a schematic view illustrating a wavelength conversion laser device according to an exemplary embodiment of the present invention.

FIG. 2 is a schematic configuration view illustrating a wavelength conversion laser device according to an exemplary embodiment of the present invention.

The wavelength conversion laser device 40 shown in FIG. 2 includes a laser light source 11 for emitting a first wavelength light $\lambda_1$, a non-linear optical crystal 15 for converting the first wavelength light $\lambda_1$ to output a second wavelength light $\lambda_2$, a rotator 16 in which the non-linear optical crystal 15 is disposed, and a non-linear crystal rotation driving controller 20 for controlling phase matching of the non-linear optical crystal 15.

The non-linear optical crystal rotation driving controller 20 monitors an output change of the second wavelength light $\lambda_2$ and provides corresponding displacement for phase matching to the non-linear optical crystal in order to prevent degradation of wavelength conversion efficiency due to temperature change.

As shown in FIG. 2, the non-linear optical crystal rotation driving controller 20 may include a first beam splitter 22 for sampling a portion Lp of the output light of the non-linear optical crystal 15, and a first electronic controller 27 for monitoring the output change of the second wavelength light with the sampled output light Lp to drive the nonlinear optical crystal rotator 16 for phase matching.

In this embodiment, the nonlinear optical crystal rotation driving controller 20 may include a spectral filter 24 disposed between the first beam splitter 22 and the first electronic controller 27. The spectral filter 24 selectively separates the second wavelength light for actual monitoring by the first electronic controller. The first electronic controller 27 may include a first output monitor 27a for detecting the output change Δp of the second wavelength light and a first driving controller 27b for generating a rotation control signal Sp for phase matching in accordance with the detected output change Δp and transmitting the rotation control signal Sp to the rotator 16. The rotation control signal Sp transmitted from the first driving controller 27b is a computation result based on the output change Δp of the second wavelength light and is a control signal related to the incident angle change mount $\gamma_1$ of the nonlinear optical crystal 15 necessary for phase matching.

The nonlinear optical crystal rotator 16 rotates the nonlinear optical crystal 15 by a predetermined angle according to the rotation control signal Sp, thereby maintaining optimal wavelength conversion efficiency even in the changed temperature condition.

In the above described phase matching process, the incident angle of the first wavelength light $\lambda_1$ into the nonlinear optical crystal 15 changes, and accordingly, the second wavelength light exits in an exit position L2 altered from the initial exit position L1.

The wavelength conversion laser device 40 according to the present invention adopts a light exit position adjustor 30 to compensate for such change Δα in the exit position and maintain a regulated exit position of the second wavelength light. The light exit position adjustor 30 monitors the exit position change according to the incident angle change of the first wavelength light to compensate for the exit position change.

As shown in FIG. 2, the light exit position adjustor 30 includes a transparent optical member 35 and a rotator 36 for rotating the optical member 35 in order for additional adjustment of the light exit position.

The transparent optical member 35 has a predetermined refractive index and a predetermined thickness to change an exit position according to an incident angle of light. The optical member 35 should be made of a transparent material so as not to affect the wavelength of output light and to minimize light loss, and can preferably have anti-reflective coating on a surface thereof.

In addition, it is preferable for the transparent optical member 35 to have a first surface used as an incident surface and a second surface used as an exiting surface in parallel with the first surface so that the change of the exit position can be easily computed through the refractive index and the thickness of the transparent optical member 35. For example, the transparent optical member 35 can be made of an optical isotropic material or made of the same material as the nonlinear optical crystal 15.

The optical member rotator 36 can rotate the transparent optical member 35 to adjust the incident angle of the second wavelength light, thereby adjusting the second wavelength light $\lambda_2$ to a desired position. The optical member rotator 36 may be a rotating apparatus similar to the nonlinear optical crystal rotator 26, and can be driven to compensate for the exit position change due to rotation of the nonlinear optical crystal rotator 26.

As shown in FIG. 2, the light exit position adjustor 30 includes an optical member rotation driving controller, which controls a rotation amount of the optical member rotator 36 so as to compensate for the exit position change of the second wavelength light due to rotation of the nonlinear optical crystal 35.

Similar to the nonlinear optical crystal rotation driving controller 20, the optical member rotation driving controller includes a second beam splitter 32 for detecting a portion Ld of light output from the nonlinear optical crystal 15, and a second electronic controller 37 for driving the optical member rotator 36 in accordance with the rotation control signal Sd determined from the detected portion Ld of light.

In this embodiment, the second beam splitter 32 can be installed at any location where the exit position can be changed. However, in a case where the exit position is detected from a front end of the transparent optical member 35, even if the transparent optical member 35 is used to control the exit position, the position compensation process can be complicated due to the nonlinearity of the refractive index of the optical member. Therefore, it is preferable as in this embodiment, that the second beam splitter 32 is disposed at an output side of the transparent optical member 35. This disposition allows detecting the exit position change from the positional change of the output beam at the final output side, thereby enabling more precise compensation of the exit position.

In this embodiment, the optical member rotation driving controller provides information of the exit position change through a spatial filter 34. The spatial filter 34 has slits formed along an output direction of the second wavelength light, and provides the exit position information based on the output amount change of the second wavelength light $\lambda_2$ passing through the slits due to the exit position change of the second wavelength light $\lambda_2$ (explained in detail with reference to FIG. 4). In this embodiment, the spatial filter 34 is disposed between the transparent optical member 35 and the second beam splitter 32, but it can also be disposed between the second beam splitter 32 and the second electronic controller 37 as long as the location allows providing the information related to the exit position of the sampled light Ld from the second beam splitter 32.

In addition, the second electronic controller 37 may include a second output monitor 37a for detecting the exit position change Δd of the second wavelength light due to the rotation $\gamma_1$ of the nonlinear optical crystal 15, and a second driving controller 37b for generating a control signal Sd for changing the incident angle of the second wavelength light into the optical member 35 in accordance with the detected exit position change Δd of the second wavelength light and transmitting the signal to the optical member rotator 36.

The optical member rotator rotates the transparent optical member 35 by a predetermined angle with the rotation control signal Sd of the second driving controller 37b, thereby maintaining a desired exit position even if the exit position is changed in the process of phase matching of the nonlinear optical crystal 15.

As described above, the wavelength conversion laser device according to the present invention can maintain a desired exit position of the second wavelength light by the assistance of the light exit position adjustor, in spite of the phase matching process.

The wavelength conversion laser device according to the present invention is not limited to the embodiment shown in FIG. 2, and can include or be replaced with various configurations of optical systems depending on the needs of the person skilled in the art.

Preferably, in order to increase the output of the second wavelength light, the wavelength conversion laser device 40 may further include a resonator structure configured to additionally convert the first wavelength light that is not converted initially by allowing the portion to pass through the nonlinear optical crystal 15. Mirrors can be adopted at opposed ends of the nonlinear crystal 15 or at a side of the laser light source 11 and an output side of the nonlinear optical crystal 15 to allow the light that is not converted, to pass through the nonlinear optical crystal 15 multiple times, thereby increasing the conversion efficiency.

FIGS. 3a to 3d are schematic views illustrating a light exit position adjusting process in accordance with a phase matching process of the wavelength conversion laser device shown in FIG. 2.

Figure 3:
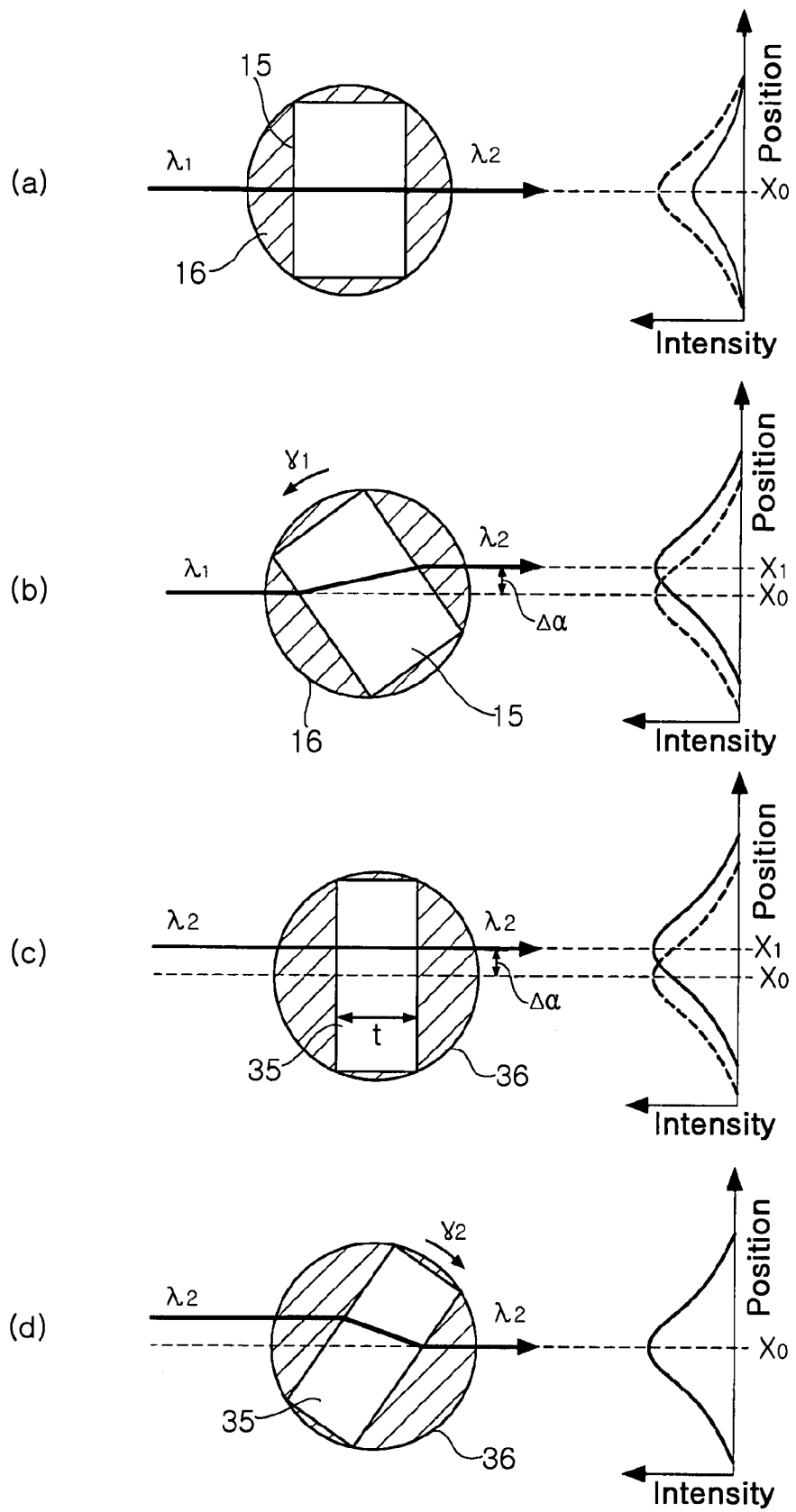
FIGS. 3a to 3d are schematic views illustrating the adjustment of the light exit position in accordance with phase matching process in the wavelength conversion laser device shown in FIG. 2.

First, FIG. 3a illustrates phase mismatching due to the temperature change. That is, initially, the nonlinear optical crystal is at a position that maintains the maximum conversion efficiency (indicated by dotted line) of the second wavelength light. Due to the temperature change, however, the refractive index of the nonlinear optical crystal is changed according to the crystal orientation, decreasing the conversion efficiency of the second wavelength light.

In this phase mismatching condition, the nonlinear optical crystal can be rotated by a predetermined angle as shown in FIG. 3b to adjust the incident angle of the first wavelength light, thereby obtaining maximum conversion efficiency. But in this case, certain displacement occurs at the exit position due to the refractive index and the thickness of the nonlinear optical crystal, according to Snell's law.

Figure 4:
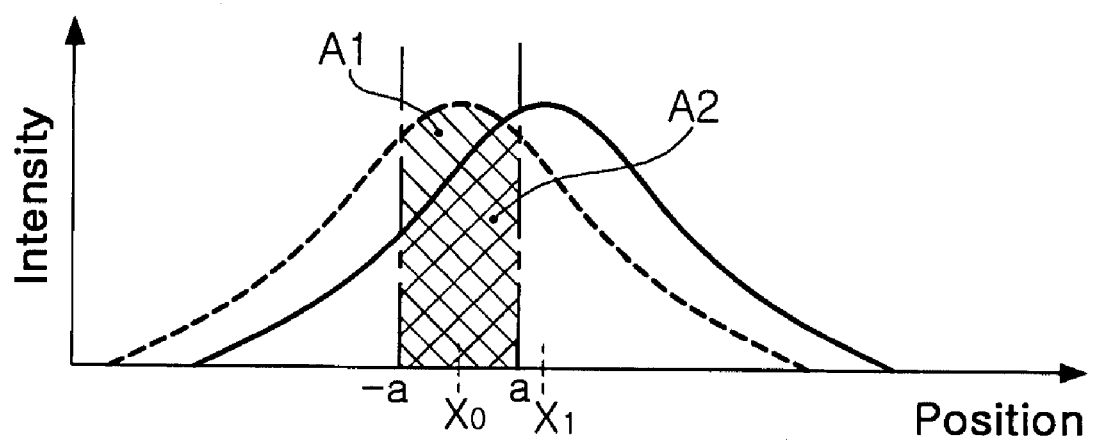
FIG. 4 is a graph illustrating a process of monitoring a light exit position change amount in the wavelength conversion laser device according to the present invention.

FIG. 3c shows the second wavelength light entering and exiting the transparent optical member when the exit position is changed in the process of phase matching. As shown in FIG. 3c, the second wavelength light passes through the transparent optical member in the changed exit position without additional wavelength conversion (a third harmonic wave, etc.). The displacement of such exit position can be detected by the aforedescribed light exit position adjustor and can be controlled as shown in FIG. 3d. For example, the slit structure of the spatial filter 34 set at a range −a to a as shown in FIG. 4 results in an output amount A2 which is smaller than the output amount A1 of the desired exit position. This change in the output amount A1-A2 can be converted to the exit position change at the second electronic controller and corresponding rotation amount of the transparent optical member 35.

The control signal related to the converted rotation amount can be transmitted to the optical member rotator to change the incident angle of the second wavelength light into the transparent optical member. That is, as shown in FIG. 3d, the transparent optical member is rotated by a predetermined angle in an opposite direction to the rotation of the nonlinear optical crystal to compensate the exit position, thereby allowing the converted second wavelength light to exit in the same initial exit position.

As set forth above, according to the present invention, when the exit position is changed by the rotation of the nonlinear optical crystal, the changed exit position is monitored and accurately controlled to desired exit position through the optical member. In particular, the exit position of the final beam, i.e., the exit position change at the output side of the transparent optical member is monitored to realize more precise exit position compensation.

Figure 5:
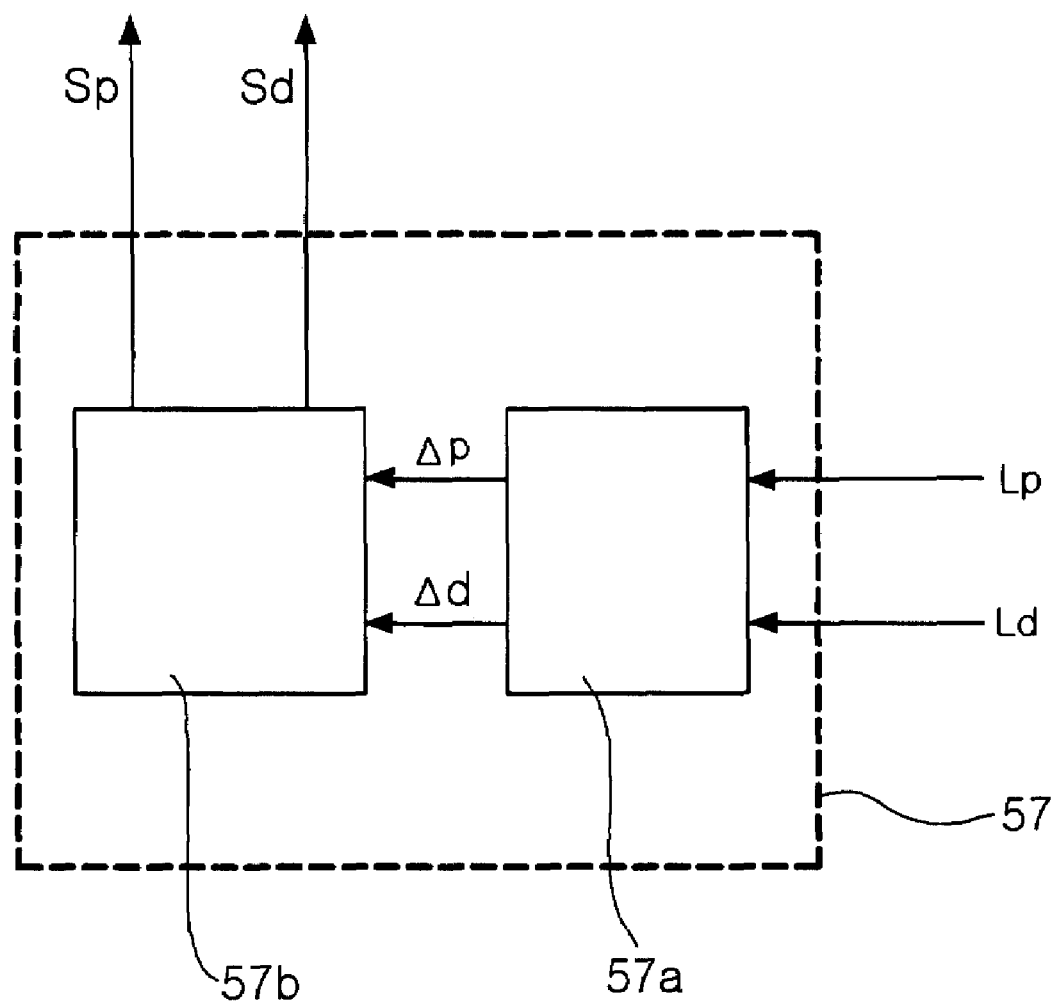
FIG. 5 illustrates a rotation driving controller adoptable to a wavelength conversion laser device according to another embodiment of the present invention.

It will be apparent to those skilled in the art that the present invention can be modified in various forms. For example, in order to further miniaturize the wavelength conversion laser device according to the present invention, the first and second electronic controllers can be integrated. An electronic controller 57 according to this embodiment is shown in FIG. 5.

That is, each of the output monitors of the first and second electronic controllers explained with reference to FIG. 2 have a common function of monitoring the changes in the outputs, and thus can be integrated into a single output monitor 57a to execute the two computation processes. In addition, respective driving controllers of the first and second electronic controllers can be configured into a single driving controller 57b which generates/transmits the rotation control signals for the nonlinear optical crystal and the transparent optical member, respectively, based on respective operation formulae. As described above, the regulator of the integrated first and second electronic controllers realize two (phase matching/exit position) feedback regulation as desired based on a known principle such as time division multiplexing, etc., thereby further miniaturizing the entire device.

According to the present invention set forth above, an exit position change due to the displacement of a nonlinear optical crystal during a phase matching process is compensated to provide a wavelength conversion laser device that can maintain a light exit position at a predetermined position. In particular, the change of a final beam exit position, i.e., an output side of the transparent optical member is monitored, thereby further simplifying the complicated exit position compensation process due to nonlinearity of the transparent optical member while achieving more precise exit position compensation.

While the present invention has been shown and described in connection with the exemplary embodiments, it will be apparent to those skilled in the art that modifications and variations can be made without departing from the spirit and scope of the invention as defined by the appended claims.

What is claimed is:

1. A wavelength conversion laser device comprising:
    a laser light source for emitting a first wavelength light;
    a nonlinear optical crystal for converting the first wavelength light into a second wavelength light;
    a nonlinear optical crystal rotator for rotating the nonlinear optical crystal so as to change an incident angle of the first wavelength light into the nonlinear optical crystal;
    a nonlinear optical crystal rotation driving controller for controlling a rotation amount of the rotator in accordance with an output change of the second wavelength light in order for the nonlinear optical crystal to have phase matching with the first wavelength light; and
    a light exit position adjustor for compensating an exit position change of the second wavelength light in accordance with the incident angle change of the first wavelength light so that the second wavelength light is outputted in a predetermined exit position.

2. The wavelength conversion laser device according to claim 1, wherein the nonlinear optical crystal rotation driving controller comprises:
    a first electronic controller for driving the nonlinear optical crystal rotator in accordance with the output change of the second wavelength light from the nonlinear optical crystal in order for the nonlinear optical crystal to have phase matching with the first wavelength light; and
    a first beam splitter for sampling a portion of light outputted from the nonlinear optical crystal to provide the sampled portion to the first electronic controller.

3. The wavelength conversion laser device according to claim 2, wherein the first electronic controller comprises:
    a first output monitor for detecting the output change of the second wavelength light; and
    a first driving controller for generating a rotation control signal corresponding to an incident angle change amount of the nonlinear optical crystal based on the detected output change of the second wavelength light and transmitting the signal to the nonlinear optical crystal rotator for phase matching with the first wavelength light.

4. The wavelength conversion laser device according to claim 2, wherein the nonlinear optical crystal rotation driving controller further comprises a spectral filter disposed between the first electronic controller and the first beam splitter, the spectral filter for selectively separating the second wavelength light from light provided from the first beam splitter and providing the second wavelength light to the first electronic controller.

5. The wavelength conversion laser device according to claim 1, wherein the light exit position adjustor comprises:
   a transparent optical member for refracting the second wavelength light according to an incident angle of the second wavelength light outputted from the nonlinear optical crystal so as to change the exit position of the second wavelength light;
   an optical member rotator for rotating the transparent optical member so as to change the incident angle of the second wavelength light into the transparent optical member; and
   an optical member rotation driving controller for controlling a rotation amount of the optical member rotator so as to compensate the exit position change of the second wavelength light due to rotation of the nonlinear optical crystal.

6. The wavelength conversion laser device according to claim 2, wherein the light exit position adjustor comprises:
   a transparent optical member for refracting the second wavelength light according to an incident angle of the second wavelength light outputted from the nonlinear optical crystal so as to change the exit position of the second wavelength light;
   an optical member rotator for rotating the transparent optical member so as to change the incident angle of the second wavelength light into the transparent optical member; and
   an optical member rotation driving controller for controlling a rotation amount of the optical member rotator so as to compensate the exit position change of the second wavelength light due to rotation of the nonlinear optical crystal.

7. The wavelength conversion laser device according to claim 3, wherein the light exit position adjustor comprises:
   a transparent optical member for refracting the second wavelength light according to an incident angle of the second wavelength light outputted from the nonlinear optical crystal so as to change the exit position of the second wavelength light;
   an optical member rotator for rotating the transparent optical member so as to change the incident angle of the second wavelength light into the transparent optical member; and
   an optical member rotation driving controller for controlling a rotation amount of the optical member rotator so as to compensate the exit position change of the second wavelength light due to rotation of the nonlinear optical crystal.

8. The wavelength conversion laser device according to claim 4, wherein the light exit position adjustor comprises:
   a transparent optical member for refracting the second wavelength light according to an incident angle of the second wavelength light outputted from the nonlinear optical crystal so as to change the exit position of the second wavelength light;
   an optical member rotator for rotating the transparent optical member so as to change the incident angle of the second wavelength light into the transparent optical member; and
   an optical member rotation driving controller for controlling a rotation amount of the optical member rotator so as to compensate the exit position change of the second wavelength light due to rotation of the nonlinear optical crystal.

9. The wavelength conversion laser device according to claim 5, wherein the transparent optical member comprises a first surface used as an incident surface and a second surface in parallel with the first surface and used as an exit surface.

10. The wavelength conversion laser device according to claim 9, wherein the transparent optical member comprises an optical isotropic material.

11. The wavelength conversion laser device according to claim 9, wherein the transparent optical member comprises the same material as the nonlinear optical crystal.

12. The wavelength conversion laser device according to claim 5, wherein the first beam splitter is disposed between the nonlinear optical crystal and the transparent optical member.

13. The wavelength conversion laser device according to claim 5, wherein the optical member rotation driving controller comprises:
   a second electronic controller for driving the optical member rotator in accordance with the output change of the second wavelength light from the nonlinear optical crystal so that the second wavelength light exits from the transparent optical member in a predetermined exit position; and
   a second beam splitter for detecting a portion of light outputted from the nonlinear optical crystal to provide the potion of light to the second electronic controller.

14. The wavelength conversion laser device according to claim 13, wherein the second electronic controller comprises:
   a second output monitor for detecting the exit position change of the second wavelength light due to rotation of the nonlinear optical crystal; and
   a second driving controller for generating a control signal corresponding to an incident angle change amount of the optical member and transmitting the signal to the optical member rotator so as to compensate the detected exit position change of the second wavelength light.

15. The wavelength conversion laser device according to claim 13, wherein the second beam splitter is disposed at an output side of the transparent member.

16. The wavelength conversion laser device according to claim 13, wherein the optical member rotation driving controller further comprises a spatial filter having a slit formed along an output direction of the second wavelength light, the spatial filter configured to change an output amount of the second wavelength light passing through the slit according to the exit position change of the second wavelength light.

17. The wavelength conversion laser device according to claim 16, wherein the spatial filter is disposed between the transparent optical member and the second beam splitter.

18. The wavelength conversion laser device according to claim 13, wherein the first and second electronic controllers are integrated.

19. The wavelength conversion laser device according to claim 1, further comprising a resonator structure configured to allow the first wavelength light to additionally pass through the nonlinear optical crystal in order to increase an output of the second wavelength light.

* * * * *